O. JONSSON.
MOTOR SLEIGH.
APPLICATION FILED MAY 14, 1915.

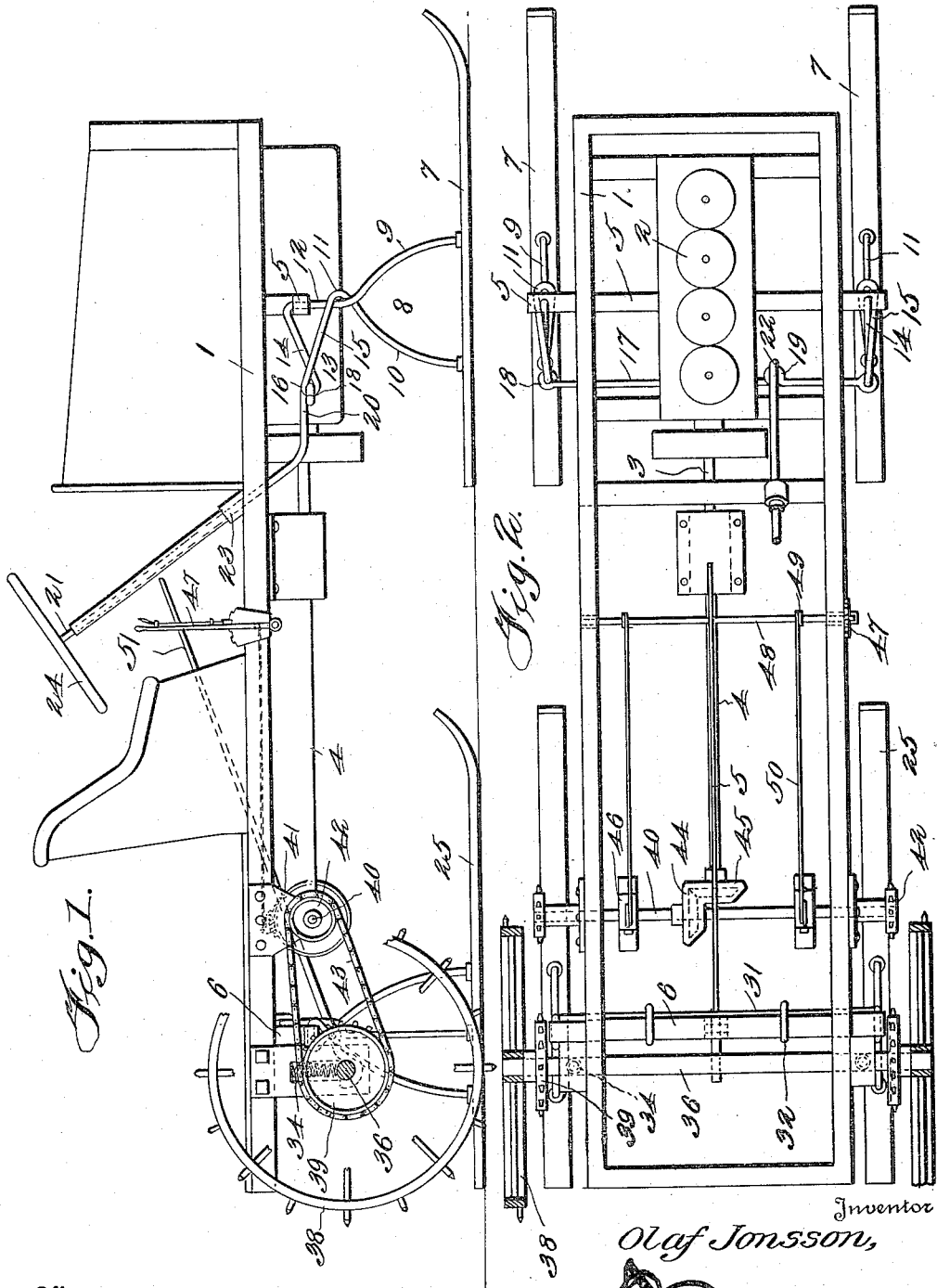

1,163,411.

Patented Dec. 7, 1915.
2 SHEETS—SHEET 2.

Witnesses

Inventor
Olaf Jonsson,
By
Attorney

UNITED STATES PATENT OFFICE.

OLAF JONSSON, OF MILWAUKEE, WISCONSIN.

MOTOR-SLEIGH.

1,163,411.　　　　Specification of Letters Patent.　　Patented Dec. 7, 1915.

Application filed May 14, 1915. Serial No. 28,115.

*To all whom it may concern:*

Be it known that I, OLAF JONSSON, a citizen of the United States, residing at Milwaukee, in the county of Milwaukee and State of Wisconsin, have invented certain new and useful Improvements in Motor-Sleighs; and I do hereby declare the following to be a full, clear, and exact description of the invention, such as will enable others skilled in the art to which it appertains to make and use the same.

This invention relates to improvements in motor sleighs.

One object of the invention is to effect improvements in the construction of the runner trucks.

Another object is to provide improved steering means.

With the above and other objects in view, the invention consists in the construction, combination and arrangement of devices hereinafter described and claimed.

Figure 3:
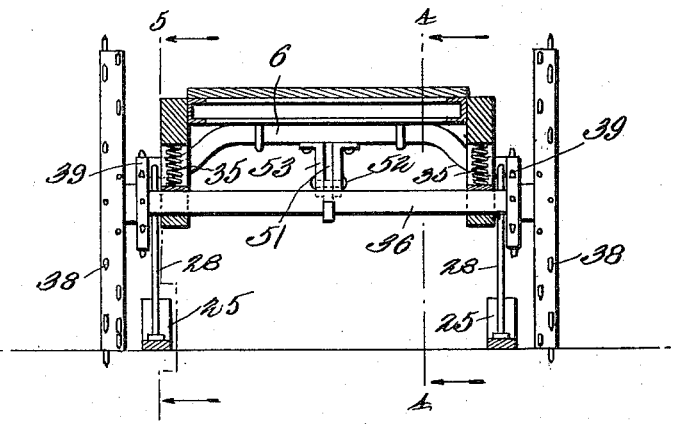
Figure 4:
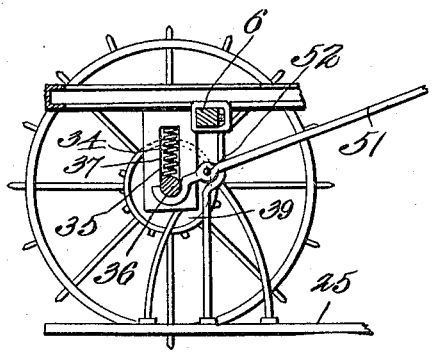
Figure 5:
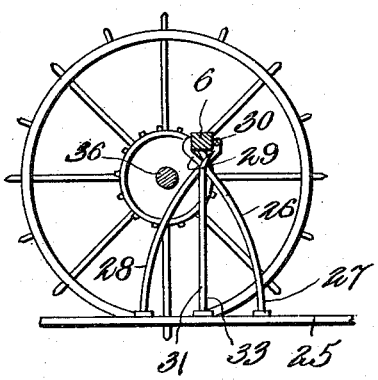

In the accompanying drawings:—Figure 1 is a side elevation of a motor sleigh constructed in accordance with my invention. Fig. 2 is a plan of the chasis and operating mechanism. Fig. 3 is a vertical transverse sectional view, showing the rear trucks and the propelling shaft and tractor wheel. Fig. 4 is a detail vertical sectional view of the rear portion of the motor sleigh on the plane indicated by the line 4—4 of Fig. 3. Fig. 5 is a similar view on the plane indicated by the line 5—5 of Fig. 3.

The chassis 1 may be of the form here shown or of any other suitable form. The motor is indicated at 2 and may be of any suitable form of internal combustion or electric motor. The motor shaft is indicated at 3 and the guide shaft at 4.

The chassis is provided with front and rear bolsters 5—6 respectively and below the ends of the front bolster are the front runners 7 each of which has a standard 8 composed of a doubled and bent spring rod forming front and rear upwardly converging arms 9—10, intertwisted at 11 and also forming a vertical pivotal extension 12 of the arm 9, which is pivotally mounted in a vertical opening in the front bolster, and a steering arm 13 comprising upper and lower members 14—15 which respectively extend rearwardly from the extension 12 and upper end of the arm 10 and form an eye 16 to which a steering bar 17 is connected as at 18. The steering bar has an eye 19 to which the forwardly extending arm 20 of the steering shaft 21 is loosely and pivotally connected as at 22, the steering shaft being mounted in an inclined position in a suitable tubular bearing 23 and being provided at its upper end with a steering wheel 24.

By the construction of the standards 8 of the oppositely curved spring arms connected together at their upper ends the said standards are rendered resilient and springy thus enabling the front runners to accommodate themselves to surface inequalities and causing the sleigh to run evenly and without jolt. The rear runners 25 are provided with similarly constructed standards 26 the front and rear arms 27—28 of which are crossed near their upper ends as at 29 and formed with a bight 30 the said bights passing through horizontal openings near the upper end of the bolster 6. An inverted U-shaped spring brace rod 31 is also provided which has its intermediate portion secured on the front side of the rear bolster 6 by means of suitable clips 32, its vertical arms or ends 33 extending down to the rear runners and being attached thereto at points midway between the lower ends of the arms of the standards 26. The said standards 26 and brace rod 31 enable the rear runners to spring easily and to also accommodate themselves to surface inequalities.

The chassis is provided at points on the rear side of the rear bolster with bearing blocks 34 each of which has a vertical slot 35. A propelling shaft 36 is mounted in the bearing blocks and is normally held at the lower end of the slot by springs 37. Traction wheels 38 are at the ends of said shaft and rotate therewith and said shaft is also provided with sprocket wheels 39 which are arranged near the inner sides of the traction wheels.

A transversely arranged counter shaft 40 is mounted in bearings 41 at the sides of the chassis and at a suitable distance in front of the propelling shaft 36 and is provided at its ends with sprocket wheels 42 which are connected by endless sprocket chains 43 with said sprocket wheels 39. Said counter shaft also has a miter gear 44 which is engaged by a similar gear 45 at the rear end of the guide shaft 4.

It will be understood from the foregoing that when the motor is in operation and the guide shaft is clutched the propelling shaft with its traction wheels will be revolved in order to move the sleigh forwardly. Brakes 46 are provided on the counter shaft and are operated by a lever 47 and a rock shaft 48, the rock arms 49 of which are connected by rods 50 to the brake straps. I also provide a lever 51 for raising and lowering the propelling shaft 36 together with its traction wheels so as to cause the traction wheels to operate as independently as desired in the snow or to entirely raise them above the snow to stop the sleigh suddenly. This lever is fulcrumed as at 52 at the lower end of a hanger 53 and the rear end of said lever is engaged under the shaft 36 as at 54.

While I have herein shown and described a preferred form of my invention, I would have it understood that changes may be made in the form, proportion and construction, of the several parts, without departing from the spirit of the invention and within the scope of the appended claims.

Having thus described my invention, I claim:—

1. In a sleigh of the class described, a frame or body, front runners each having a spring standard extending upwardly therefrom and comprising upwardly converging front and rear spring arms connected together at their upper ends, one of said arms having a vertical extension pivotally mounted in the frame or body and said arms having rearwardly extending members united together and forming a steering arm, a steering bar connecting said steering arms of the runner standards and a pivotally mounted steering shaft having an arm connected to said steering rod.

2. In a sleigh of the class described, a frame or body, front runners each having a spring standard extending upwardly therefrom and comprising upwardly converging front and rear spring arms connected together at their upper ends, said front arms having a vertical extension pivotally mounted in the frame or body and extending rearwardly, said rear arms twisted around the vertical extensions of the front arms and extending rearwardly to meet with the front arms and forming a steering arm, a steering bar connecting said steering arm of the runner standards and a pivotally mounted steering shaft having an arm connected to said steering rod.

3. In a sleigh of the class described, a frame or body, front runners each having a spring standard extending upwardly therefrom and comprising upwardly converging front and rear arms connected together at their upper ends, one of said arms having a vertical extension pivotally mounted in the frame or body and said arms having rearwardly extending members united together and forming a steering arm, a steering bar adapted to have its ends bent to form an eye to receive the rearwardly extending members of the spring arm, said steering bar being provided with an eye intermediate its length adapted to receive the end of a steering shaft and means for supporting said steering shaft.

4. In a sleigh of the class described, a frame or body, rear runners, each having a spring standard extending upwardly therefrom and comprising upwardly converging front and rear spring arms adapted to cross each other adjacent their upper ends forming a bight, said bight secured to the frame or body, an inverted U-shaped spring brace rod connected to the frame or body intermediate its ends and said spring brace rod having its ends bent downwardly and secured to the runners intermediate the lower ends of said arms of the standards.

In testimony whereof I affix my signature in presence of two witnesses.

OLAF JONSSON.

Witnesses:
 HARVEY THOSS,
 CARL LINDHOLM.

Copies of this patent may be obtained for five cents each, by addressing the "Commissioner of Patents, Washington, D. C."